(12) United States Patent
Narimatsu et al.

(10) Patent No.: US 8,382,288 B2
(45) Date of Patent: Feb. 26, 2013

(54) PROJECTOR WITH SOLID STATE LIGHT SOURCE

(75) Inventors: Shuji Narimatsu, Suwa (JP); Akira Miyamae, Fujini-machi (JP)

(73) Assignee: Seiko Epson Corporation, Tokyo (JP)

( * ) Notice: Subject to any disclaimer, the term of this patent is extended or adjusted under 35 U.S.C. 154(b) by 275 days.

(21) Appl. No.: 12/827,260

(22) Filed: Jun. 30, 2010

(65) Prior Publication Data

US 2011/0051095 A1    Mar. 3, 2011

(30) Foreign Application Priority Data

Aug. 27, 2009    (JP) ................................ 2009-196442

(51) Int. Cl.
*G03B 21/00* (2006.01)

(52) U.S. Cl. ................ 353/31; 353/33; 353/34; 353/37; 353/81; 353/98; 353/99; 362/553; 362/555; 362/561

(58) Field of Classification Search .................. 353/31, 353/33, 34, 37, 81, 85, 98, 99, 122; 257/102, 257/88, E25.021, E27.12, 89, 90, 91, 98, 257/103, 100, 200, 201; 313/112, 498, 501, 313/503, 506, 512; 372/20, 23, 29.01, 9; 362/551, 553, 555, 561
See application file for complete search history.

(56) References Cited

U.S. PATENT DOCUMENTS

| | | | |
|---|---|---|---|
| 6,319,425 B1 * | 11/2001 | Tasaki et al. | 252/301.36 |
| 6,747,710 B2 * | 6/2004 | Hall et al. | 349/9 |
| 6,961,179 B2 * | 11/2005 | Chen et al. | 359/485.04 |
| 7,005,679 B2 * | 2/2006 | Tarsa et al. | 257/89 |
| 7,258,453 B2 | 8/2007 | Inamoto | |
| 7,475,993 B2 * | 1/2009 | Takeda | 353/31 |
| 7,547,114 B2 | 6/2009 | Li et al. | |
| 8,026,659 B2 * | 9/2011 | Tang et al. | 313/501 |
| 8,096,668 B2 * | 1/2012 | Abu-Ageel | 362/84 |
| 2006/0001838 A1 * | 1/2006 | Yoshii et al. | 353/31 |
| 2008/0151196 A1 * | 6/2008 | Kinoshita | 353/69 |
| 2008/0259224 A1 * | 10/2008 | Roth | 348/750 |
| 2009/0034284 A1 | 2/2009 | Li et al. | |
| 2009/0284148 A1 * | 11/2009 | Iwanaga | 313/506 |
| 2010/0149222 A1 * | 6/2010 | Welford et al. | 345/690 |

FOREIGN PATENT DOCUMENTS

| | | |
|---|---|---|
| CN | 1885095 A | 12/2006 |
| CN | 1892285 A | 1/2007 |
| JP | A-2002-268140 | 9/2002 |
| JP | A-2004-327361 | 11/2004 |
| JP | A-2005-274957 | 10/2005 |
| JP | A-2009-150938 | 7/2009 |

* cited by examiner

*Primary Examiner* — Georgia Y Epps
*Assistant Examiner* — Sultan Chowdhury
(74) *Attorney, Agent, or Firm* — Oliff & Berridge, PLC

(57) ABSTRACT

A projector includes: a first solid-state light source device including a first solid-state light source emitting main excitation light, and a fluorescent layer converting the main excitation light to light including a first color light component and a second color light component different from the first color light component, and emitting converted light; a second solid-state light source device including a second solid-state light source emitting a third color light component different from the first and second color light components; a light modulation device modulating the first, second and third color light components in accordance with image information; a projection optical system projecting the modulated light components from the light modulation device as a projection image; and a color light combining optical system combining light emitted from the first solid-state light source device and the third color light component.

18 Claims, 8 Drawing Sheets

PROJECTOR WITH SOLID STATE LIGHT SOURCE

BACKGROUND

1. Technical Field

The present invention relates to a projector, and in particular, to a projector using a solid-state light source.

2. Related Art

A projector is known which includes a single solid-state light source device emitting white light, a color separating and guiding optical system separating light from the single solid-state light source device into a red light component, a green light component, and a blue light component, a light modulation device modulating the respective color light components from the color separating and guiding optical system in accordance with image information, and a projection optical system projecting the modulated light components from the light modulation device as a projection image (for example, see JP-A-2005-274957). According to the projector described in JP-A-2005-274957, the three color light components which are obtained by separating white light emitted from the single solid-state light source device are used as the three color light components (red light component, green light component, and blue light component) which are modulated by the light modulation device. Unlike a projector which includes three solid-state light source devices, the light-emission efficiency (brightness per unit power) or the temperature characteristic (the change of light amount with change in temperature) does not differ between the solid-state light source devices. As a result, the color balance of the projection image can be stabilized.

A projector is also known which includes a solid-state light source device emitting a red light component, a solid-state light source device emitting a green light component, a solid-state light source device emitting a blue light component, a light modulation device modulating the color light components from the respective solid-state light source devices in accordance with image information, and a projection optical system projecting the modulated light components from the light modulation device as a projection image (for example, see JP-A-2002-268140). According to the projector described in JP-A-2002-268140, separate solid-state light source devices (a solid-state light source device emitting a red light component, a solid-state light source device emitting a green light component, and a solid-state light source device emitting a blue light component) are provided for the respective color light components (red light component, green light component, and blue light component), and the three color light components which are respectively emitted from the three solid-state light source devices are used as the three color light components (red light component, green light component, and blue light component) which are modulated by the light modulation device. Thus, the projection image can be brightened compared to a projector which includes a single solid-state light source device.

However, according to the projector described in JP-A-2005-274957, since white light including a red light component, a green light component, and a blue light component is generated from the single solid-state light source device, unlike a projector which includes three solid-state light source devices, a significant thermal load is concentrated on the single solid-state light source device. As a result, it is difficult to further brighten the projection image.

According to the projector described in JP-A-2002-268140, it is difficult to make the three solid-state light source devices respectively emitting the red light component, the green light component, and the blue light component (the solid-state light source device emitting the red light component, the solid-state light source device emitting the green light component, and the solid-state light source device emitting the blue light component) the same light-emission efficiency or temperature characteristic. For this reason, it is difficult to stabilize the color balance of the projection image.

SUMMARY

An advantage of some aspects of the invention is that it provides a projector capable of brightening a projection image compared to a projector including a single solid-state light source device, and stabilizing the color balance of the projection image compared to a projector including separate solid-state light source devices for respective color light components.

A projector according to an aspect of the invention includes a first solid-state light source device which includes a first solid-state light source emitting main excitation light, and a fluorescent layer converting main excitation light emitted from the first solid-state light source to light including a first color light component and a second color light component different from the first color light component, and emitting converted light, a second solid-state light source device which includes a second solid-state light source emitting a third color light component different from the first color light component and the second color light component, a light modulation device modulating the first color light component, the second color light component, and the third color light component in accordance with image information, a projection optical system projecting the modulated light components from the light modulation device as a projection image, and a color light combining optical system combining light emitted from the first solid-state light source device and the third color light component emitted from the second solid-state light source device.

According to this projector, the two color light components (first color light component and second color light component) emitted from the first solid-state light source device and the one color light component (third color light component) emitted from the second solid-state light source device are used as the three color light components (red light component, green light component, and blue light component) which are modulated by the light modulation device. Therefore, the thermal load imposed on the respective solid-state light source devices can be reduced compared to a projector which includes a single solid-state light source device. As a result, the projection image can be brightened compared to a projector which includes a single solid-state light source device.

According to this projector, two color light components (first color light component and second color light component) from among the three color light components (red light component, green light component, and blue light component) which are modulated by the light modulation device are generated by using a common solid-state light source (first solid-state light source). Therefore, the color balance of the projection image can be stabilized compared to a projector which includes separate three solid-state light source devices for respective color light components.

As a result, the projector according to the aspect of the invention can brighten the projection image compared to a projector which includes a single solid-state light source device, and can stabilize the color balance of the projection image compared to a projector which includes separate three solid-state light source devices for respective color light components.

This projector includes the color light combining optical system combining light emitted from the first solid-state light source device and the third color light component emitted from the second solid-state light source device. Therefore, it is not necessary to provide exclusive-use optical systems for light emitted from the first solid-state light source device and the third color light component emitted from the second solid-state light source device, such that the number of components can be reduced.

In the projector according to the aspect of the invention, when a three-plate light modulation device is used as the light modulation device, with the above-described configuration, a full color projector can be constituted by using a color separating and guiding optical system which is widely used at present.

In the projector according to the aspect of the invention, when a single-plate light modulation device is used as the light modulation device, with the above-described configuration, a full color projector can be constituted by using a color wheel which is widely used at present.

The projector according to the aspect of the invention may further include a first collimation optical system parallelizing light emitted from the first solid-state light source device, and a second collimation optical system parallelizing the third color light component emitted from the second solid-state light source device. The color light combining optical system may be disposed in a region including at an intersection between an optical axis of the first collimation optical system and an optical axis of the second collimation optical system to directly transmit light which is converted by the fluorescent layer and emitted from the fluorescent layer, to reflect the third color light component from the second solid-state light source device, and to combine light emitted from the first solid-state light source device and the third color light component with each other.

With this configuration, light (including the first color light component and the second color light component) emitted from the first solid-state light source device and the third color light component emitted from the second solid-state light source device can be combined together as parallel light.

The projector according to the aspect of the invention may further include an excitation light reflecting mirror located at the back of the first collimation optical system to directly transmit light, which is emitted from the fluorescent layer, and to reflect main excitation light, which is emitted while not being converted by the fluorescent layer, toward the fluorescent layer.

Meanwhile, in the projector according to the aspect of the invention, part of main excitation light emitted from the first solid-state light source device may directly transmit the fluorescent layer, which may cause degradation in light use efficiency, or deterioration in color reproducibility or deterioration of the light modulation device.

However, with the above-described configuration, main excitation light having directly transmitted the fluorescent layer is input again to the fluorescent layer and reused, such that light use efficiency can be improved, and consequently the projection image can be further brightened. Further, with the above-described configuration, main excitation light can be removed from light from the first solid-state light source device. As a result, color reproducibility or the light modulation device can be prevented from being deteriorated due to main excitation light.

In the projector according to the aspect of the invention, main excitation light directly transmits the fluorescent layer and is converted to parallel light by the first collimation optical system. Then, parallel light is reflected by the excitation light reflecting mirror, is focused by the first collimation optical system, and is efficiently input to the light-emission region of the fluorescent layer. Therefore, it is possible to suppress the spread of the light-emission region due to the excitation light reflecting mirror being further provided.

In the projector according to the aspect of the invention, main excitation light may be a blue light component, the first color light component may be a red light component, the second color light component may be a green light component, and the third color light component may be a blue light component.

With this configuration, light including a red light component, a green light component, and a blue light component can be emitted toward the light modulation device by using the first solid-state light source and the second solid-state light source emitting blue light components together.

There is a problem in that a solid-state light source which is used in a solid-state light source device emitting a green light component has relatively low light-emission efficiency compared to a solid-state light source which is used in a solid-state light source device emitting a red light component and a solid-state light source which is used in a solid-state light source device emitting a blue light component. In contrast, the projector according to the aspect of the invention is configured such that a green light component is generated by using the first solid-state light source (emitting a blue light component) which has high light-emission efficiency compared to a solid-state light source which is used in a solid-state light source device emitting a green light component. Therefore, the light-emission efficiency can be increased compared to a case where a solid-state light source device emitting a green light component is used.

In the projector according to the aspect of the invention, the first solid-state light source and the second solid-state light source may have the same temperature characteristic.

With this configuration, with regard to all of the color light components, change in the light amount with change in temperature can be made the same. Therefore, the color balance of the projection image can be further stabilized.

In the projector according to the aspect of the invention, main excitation light may be ultraviolet light, the first color light component may be a red light component, the second color light component may be a green light component, and the third color light component may be a blue light component.

With this configuration, light including a red light component, a green light component, and a blue light component can be emitted toward the light modulation device by using the first solid-state light source emitting ultraviolet light and the second solid-state light source emitting a blue light component.

A green light component is generated by using the first solid-state light source (emitting ultraviolet light) which has high light-emission efficiency compared to a solid-state light source which is used in a solid-state light source device emitting a green light component. Therefore, the light-emission efficiency can be increased compared to a case where a solid-state light source device emitting a green light component is used.

The projector according to the aspect of the invention may further include a third solid-state light source device which includes a third solid-state light source emitting auxiliary excitation light. The fluorescent layer may be configured such that auxiliary excitation light is input in a direction different from a direction in which main excitation light is input, and the fluorescent layer may be configured to convert auxiliary excitation light with main excitation light to light including the first color light component and the second color light component and to emit converted light.

With this configuration, light including the first color light component and the second color light component can be emitted from the first solid-state light source device by using two kinds of excitation light of main excitation light and auxiliary excitation light. Therefore, the projection image can be further brightened.

The projector according to the aspect of the invention may further include a first collimation optical system parallelizing light emitted from the first solid-state light source device, a second collimation optical system parallelizing the third color light component emitted from the second solid-state light source device, and a third collimation optical system parallelizing auxiliary excitation light emitted from the third solid-state light source device. The color light combining optical system may be disposed in a region including an intersection between an optical axis of the first collimation optical system, an optical axis of the second collimation optical system, and an optical axis of the third collimation optical system to directly transmit light, which is converted by the fluorescent layer and emitted from the fluorescent layer, to reflect the third color light component from the second solid-state light source device, thereby combining light emitted from the first solid-state light source and the third color light component with each other, and to reflect auxiliary excitation light from the third solid-state light source device such that auxiliary excitation light is input to the fluorescent layer in an opposite direction to a direction in which main excitation light is input from the first solid-state light source.

With this configuration, light (including the first color light component and the second color light component) emitted from the first solid-state light source device and the third color light component emitted from the second solid-state light source device can be combined together as parallel light.

In the projector according to the aspect of the invention, auxiliary excitation light which is converted to parallel light by the third collimation optical system is reflected as parallel light by the color light combining optical system, is focused by the first collimation optical system, and is efficiently input to the light-emission region of the fluorescent layer. Therefore, it is possible to suppress the spread of the light-emission region due to the third solid-state light source device being further provided.

In the projector according to the aspect of the invention, main excitation light may be a blue light component, the first color light component may be a red light component, the second color light component may be a green light component, the third color light component may be a blue light component, and auxiliary excitation light may be a blue light component.

With this configuration, light including a red light component, a green light component, and a blue light component can be emitted toward the light modulation device by using the first solid-state light source, the second solid-state light source, and the third solid-state light source emitting blue light components together.

A green light component is generated by using the first solid-state light source and the third solid-state light source (emitting blue light components together) which have high light-emission efficiency compared to a solid-state light source which is used in a solid-state light source device emitting a green light component. Therefore, light-emission efficiency can be increased compared to a case where a solid-state light source device emitting a green light component is used.

In the projector according to the aspect of the invention, the first solid-state light source, the second solid-state light source, and the third solid-state light source may have the same temperature characteristic.

With this configuration, with regard to all of the color light components, change in the light amount with change in temperature can be made the same. Therefore, the color balance of the projection image can be further stabilized.

In the projector according to the aspect of the invention, main excitation light may be a blue light component, the first color light component may be a red light component, the second color light component may be a green light component, the third color light component may be a blue light component, and auxiliary excitation light may be ultraviolet light.

With this configuration, light including a red light component, a green light component, and a blue light component can be emitted toward the light modulation device by using the first solid-state light source and the second solid-state light source emitting blue light components together and the third solid-state light source emitting ultraviolet light.

A green light component is generated by using the first solid-state light source (emitting a blue light component) and the third solid-state light source (emitting ultraviolet light) which have high light-emission efficiency compared to a solid-state light source which is used in a solid-state light source device emitting a green light component. Therefore, light-emission efficiency can be increased compared to a case where a solid-state light source device emitting a green light component is used.

The projector according to the aspect of the invention may further include an excitation light reflecting mirror disposed in front of the color light combining optical system to directly transmit light, which is converted by the fluorescent layer and emitted from the fluorescent layer, and to reflect main excitation light, which is emitted while being not converted by the fluorescent layer, toward the fluorescent layer.

With this configuration, main excitation light (blue light component) which directly transmits the fluorescent layer while being not converted is input again to the fluorescent layer and reused, such that light use efficiency can be improved, and consequently the projection image can be further brightened.

In the projector according to the aspect of the invention, main excitation light may be ultraviolet light, the first color light component may be a red light component, the second color light component may be a green light component, the third color light component may be a blue light component, and the auxiliary excitation light may be a blue light component.

With this configuration, light including a red light component, a green light component, and a blue light component can be emitted toward the light modulation device by using the first solid-state light source emitting ultraviolet light and the second solid-state light source and the third solid-state light source emitting blue light components together.

A green light component is generated by the first solid-state light source (emitting ultraviolet light) and the third solid-state light source (emitting a blue light component) which have high light-emission efficiency compared to a solid-state light source which is used in a solid-state light source device emitting a green light component. Therefore, light-emission efficiency can be increased compared to a case where a solid-state light source device emitting a green light component is used.

The projector according to the aspect of the invention may further include an excitation light reflecting mirror disposed in front of the color light combining optical system to directly transmit light, which is converted by the fluorescent layer and emitted from the fluorescent layer, and to reflect main excitation light, which is emitted while being not converted by the fluorescent layer, toward the fluorescent layer.

With this configuration, main excitation light (ultraviolet light) which directly transmits the fluorescent layer while being not converted is input again to the fluorescent layer and reused, such that light use efficiency can be improved, and consequently the projection image can be further brightened.

In the projector according to the aspect of the invention, main excitation light may be ultraviolet light, the first color light component may be a red light component, the second color light component may be a green light component, the third color light component may be a blue light component, and auxiliary excitation light may be ultraviolet light.

With this configuration, light including a red light component, a green light component, and a blue light component can be emitted toward the light modulation device by using the first solid-state light source and the third solid-state light source emitting ultraviolet light together and the second solid-state light source emitting a blue light component.

A green light component is generated by using the first solid-state light source and the third solid-state light source (emitting ultraviolet light together) which have high light-emission efficiency compared to a solid-state light source which is used in a solid-state light source device emitting a green light component. Therefore, light-emission efficiency can be increased compared to a case where a solid-state light source device emitting a green light component is used.

In the projector according to the aspect of the invention, the fluorescent layer may be formed of a layer containing a YAG-based fluorescent material, a silicate-based fluorescent material, or a TAG-based fluorescent material.

The above-described fluorescent material can efficiently convert excitation light (main excitation light and auxiliary excitation light) to light including a red light component and a green light component, and can emit converted light. Further, the fluorescent material itself has high reliability. Therefore, with the above-described configuration, the projection image can be further brightened, and thus a high-reliable projector can be provided.

The YAG-based fluorescent material refers to a fluorescent material, such as $(Y,Gd)_3(Al,Ga)_5O_{12}:Ce$, which has a garnet crystal structure and is based on composite oxide of yttrium and aluminum.

The silicate-based fluorescent material refers to a fluorescent material, such as $(Ca,Sr,Ba)SiO_4:Eu$, which is based on silicate salt (silicate) with various components introduced.

The TAG-based fluorescent material refers to a fluorescent material, such as $Tb_3Al_5O_{12}:Ce$, which has a garnet crystal structure and is based on composite oxide of terbium and aluminum.

In the projector according to the aspect of the invention, a function may be provided to remove a yellow light component from light from the first solid-state light source device.

With this configuration, the yellow light component can be removed from light from the first solid-state light source device. As a result, color reproducibility can be prevented from being deteriorated due to the yellow light component.

In the projector according to the aspect of the invention, a function may be provided to remove a yellow light component from light from the first solid-state light source device. In this case, the yellow light component which is included in light from the first solid-state light source device can be positively used, and a brighter projection image can be projected.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
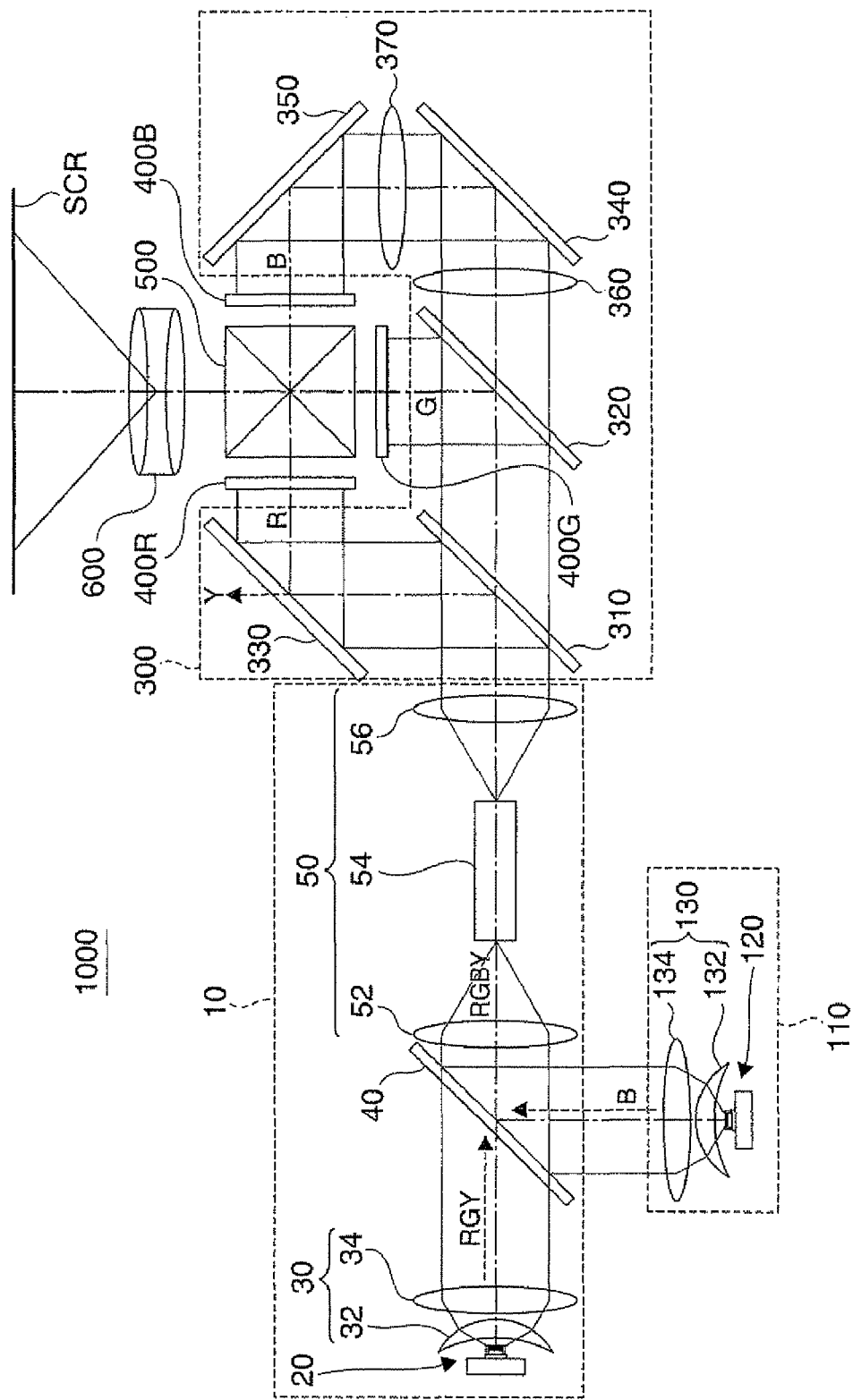
FIG. 1 is a plan view showing optical systems of a projector 1000 according to a first embodiment.

Hereinafter, a projector according to the invention will be described based on embodiments shown in the drawings.
First Embodiment First, the configuration of a projector 1000 according to a first embodiment will be described.

FIG. 1 is a plan view showing optical systems of a projector 1000 according to a first embodiment.

Figure 2A:
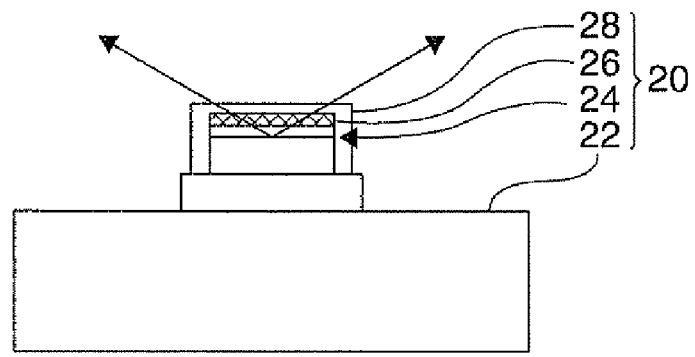
FIGS. 2A and 2B are diagrams illustrating a first solid-state light source device 20 and a second solid-state light source device 120 in the projector 1000 of the first embodiment.
Figure 2B:
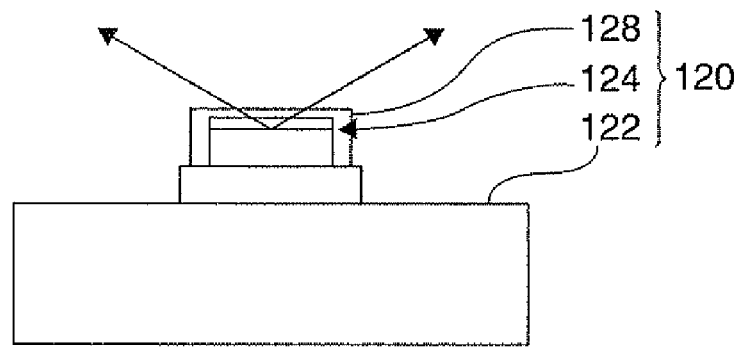

FIGS. 2A and 2B are diagrams illustrating a first solid-state light source device 20 and a second solid-state light source device 120 in the projector 1000 according to the first embodiment. FIG. 2A is a sectional view of the first solid-state light source device 20. FIG. 2B is a sectional view of the second solid-state light source device 120.

Figure 3A:
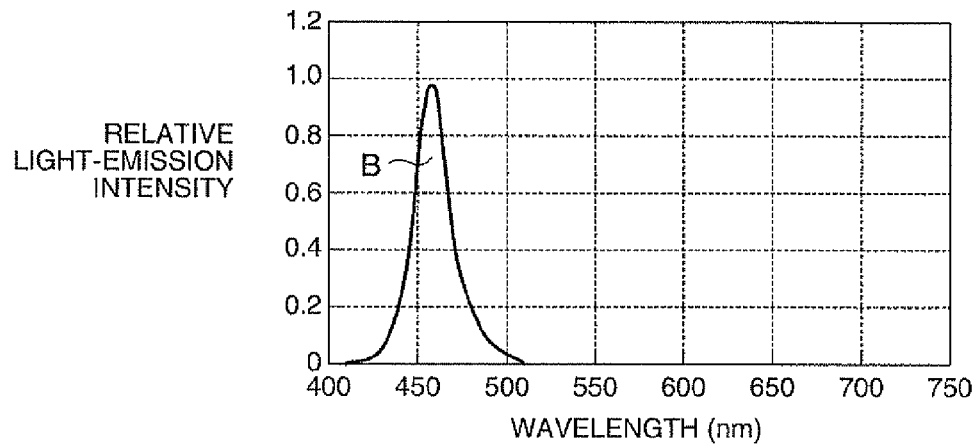
FIGS. 3A to 3C are graphs showing relative light-emission intensity of a first solid-state light source 24, a fluorescent layer 26, and a second solid-state light source 124 in the projector 1000 according to the first embodiment.
Figure 3B:
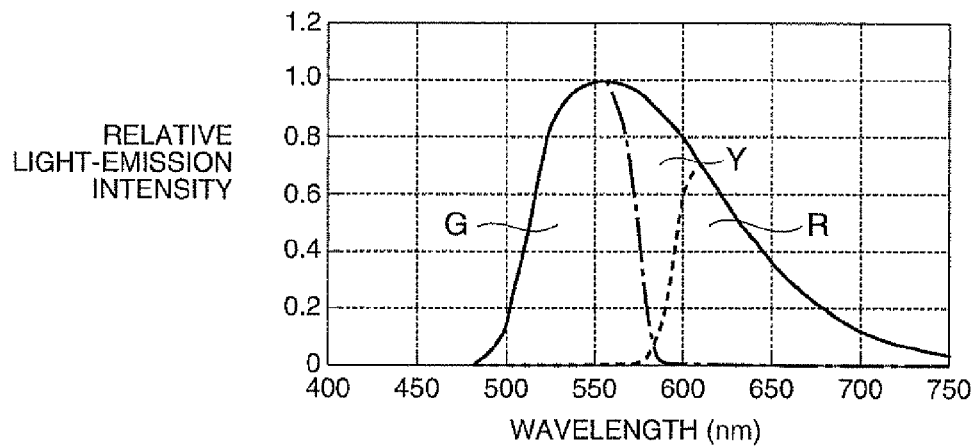
Figure 3C:
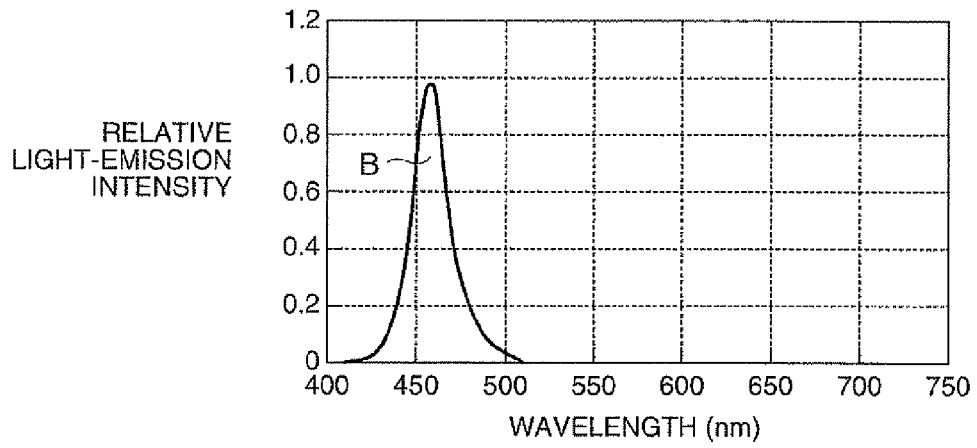

FIGS. 3A to 3C are graphs showing relative light-emission intensity of a first solid-state light source 24, a fluorescent layer 26, and a second solid-state light source 124 in the projector 1000 according to the first embodiment. FIG. 3A is a graph showing relative light-emission intensity of a first solid-state light source 24. FIG. 3B is a graph showing relative light-emission intensity of a fluorescent layer 26. FIG. 3C is a graph showing relative light-emission intensity of a second solid-state light source 124. The term "relative light-emission intensity" refers to the characteristic regarding what level of intensity of light with what kind of wavelength at the time of emission when a voltage is applied in the case of a solid-state light source and when excitation light is input in the case of a fluorescent layer. In the graphs, the vertical axis represents relative light-emission intensity. Light-emission intensity with a wavelength having the maximum light-emission intensity is set to 1. In the graphs, the horizontal axis represents a wavelength.

As shown in FIG. 1, the projector 1000 of the first embodiment includes a first illumination device 10, a second illumination device 110, a color separating and guiding optical system 300, three liquid crystal light modulation devices 400R, 400G, and 400B serving as a light modulation device, a cross dichroic prism 500, and a projection optical system 600.

The first illumination device 10 includes a first solid-state light source device 20, a first collimation optical system 30, a dichroic mirror 40, and a rod integrator optical system 50.

As shown in FIG. 2A, the first solid-state light source device 20 is a light-emitting diode which has a base 22, a first solid-state light source 24, a fluorescent layer 26, and a seal member 28, and emits light including a red light component, a yellow light component, and a green light component (see FIG. 3B which will be described below). The first solid-state light source device 20 also has lead wires and the like in addition to the above-described constituent elements, but the lead wires and the like will not be shown or described.

The base 22 is a base on which the first solid-state light source 24 is mounted.

The first solid-state light source 24 emits a blue light component (the peak of light-emission intensity: about 460 nm, see FIG. 3A) as main excitation light. In FIG. 3A, reference numeral B denotes a color light component which is emitted as main excitation light (blue light component) from the first solid-state light source 24. The first solid-state light source 24 includes gallium nitride as a main component and has a pn junction-type structure. The first solid-state light source may not have a pn junction-type structure, but may have a double heterojunction-type structure, a quantum well junction-type structure, or the like.

A reflecting layer (not shown) is formed between the first solid-state light source 24 and the base 22. A blue light component emitted from the first solid-state light source toward the base 22 is reflected toward the fluorescent layer 26 by the reflecting layer.

The fluorescent layer 26 is formed of a layer containing a $(Y,Gd)_3(Al,Ga)_5O_{12}$:Ce which is a YAG-based fluorescent material, and is disposed in the illuminated region of the first solid-state light source 24. The fluorescent layer 26 is most efficiently excited by a blue light component with a wavelength of about 460 nm. As shown in FIG. 3B, the fluorescent layer 26 converts a blue light component emitted from the first solid-state light source 24 to light including a red light component (the peak of light-emission intensity: about 610 nm), a yellow light component (the peak of light-emission intensity: about 580 nm), and a green light component (the peak of light-emission intensity: about 550 nm), and emits converted light. Referring to FIG. 3B, reference numeral R denotes a color light component, which can be used as a red light component, from among the light components emitted from the fluorescent layer 26. Reference numeral G denotes a color light component, which can be used as a green light component, from among the light components emitted from the fluorescent layer 26. Reference numeral Y denotes a color light component which is emitted as a yellow light component from the fluorescent layer.

The seal member 28 is formed of transparent epoxy resin, and protects the first solid-state light source 24 and the fluorescent layer 26.

As shown in FIG. 1, the first collimation optical system 30 includes a convex meniscus lens 32 which suppresses the spread of light from the first solid-state light source device 20, and a convex lens 34 which parallelizes light from the convex meniscus lens 32. As a whole, the first collimation optical system 30 has a function to parallelize light from the first solid-state light source device 20.

The dichroic mirror 40 is a color light combining optical system which combines light emitted from the first solid-state light source device 20 and a blue light component emitted from the second solid-state light source device 120 (which will be described below). The dichroic mirror 40 is disposed in a region including an intersection between an optical axis of the first collimation optical system 30 and an optical axis of a second collimation optical system 130 (which will be described below) to directly transmit light, which is converted by the fluorescent layer 26 and emitted from the fluorescent layer 26, and to reflect the blue light component from the second solid-state light source device 120. Specifically, the dichroic mirror 40 is a mirror which has a wavelength selective transmission film formed on a substrate to reflect a blue light component and to transmit a red light component, a yellow light component, and a green light component.

The rod integrator optical system 50 includes a convex lens 52, a rod lens 54, and a convex lens 56.

The convex lens 52 focuses parallel light from the first collimation optical system 30 and parallel light (blue light component which will be described below) from the second collimation optical system 130 reflected by the dichroic mirror 40, and guides focused light to the incidence surface of the rod lens 54.

The rod lens 54 is a solid columnar lens. The rod lens 54 multiply reflects light input from the incidence surface within the plane to make light uniform, and emits light having a uniform in-plane light-emission intensity distribution from the emission surface. As the rod lens, a hollow columnar lens, instead of a solid columnar lens, may be used.

The convex lens 56 substantially parallelizes light emitted from the emission surface of the rod lens 54, and guides relevant light to the image forming regions of the liquid crystal light modulation devices 400R, 400G, and 400B.

The second illumination device 110 includes a second solid-state light source device 120 and a second collimation optical system 130.

As shown in FIG. 2B, the second solid-state light source device 120 is a light-emitting diode which has a base 122, a second solid-state light source 124, and a seal member 128, and emits a blue light component (see FIG. 3C which will be described below). The second solid-state light source device 120 has lead wires and the like in addition to the above-described constituent elements, but the lead wires and the like will not be shown or described.

As shown in FIG. 3C, the second solid-state light source 124 emits a blue light component (the peak of light-emission intensity: about 460 nm) as a color light component. In FIG. 3C, reference numeral B denotes a color light component which is emitted as a color light component (blue light component) from the second solid-state light source 124.

The base 122, the second solid-state light source 124, and the seal member 128 respectively have the same configuration as the base 22, the first solid-state light source 24, and the seal member 28, thus detailed description thereof will not be repeated.

The first solid-state light source 24 and the second solid-state light source 124 are formed of the same material by the same manufacturing method and have the same structure. For this reason, the first solid-state light source 24 and the second solid-state light source 124 have the same temperature characteristic, such that change in the light amount with change in temperature is identical.

As shown in FIG. 1, the second collimation optical system 130 includes a convex meniscus lens 132 suppressing the spread of the blue light component from the second solid-state light source device 120, and a convex lens 134 parallelizing the blue light component from the convex meniscus lens 132. As a whole, the second collimation optical system 130 has a function to parallelize the blue light component from the second solid-state light source device 120.

The color separating and guiding optical system 300 includes a dichroic mirror 310 which is disposed upstream of the optical path, dichroic mirrors 320 and 330 which are disposed downstream of the optical path, reflecting mirrors 340 and 350, and relay lenses 360 and 370. The color separating and guiding optical system 300 has a function to separate light from the convex lens 56 into three color light components of a red light component, a green light component, and a blue light component, and to guide the respective color light components to the liquid crystal light modulation devices 400R, 400G, and 400B to be illuminated.

The dichroic mirrors 310, 320, and 330 are optical elements which have a wavelength selective transmission film formed on the substrate to reflect light having a predetermined wavelength region and to transmit light having another wavelength region.

The dichroic mirror 310 is a dichroic mirror which reflects a red light component and a yellow light component, and transmits a green light component and a blue light component.

The dichroic mirror 320 is a dichroic mirror which reflects a green light component, and transmits a blue light component.

The dichroic mirror 330 is a dichroic mirror which reflects a red light component, and transmits a yellow light component. The yellow light component having transmitted the dichroic mirror 330 is removed outside the system. That is, the projector 1000 has a function to remove the yellow light component by the dichroic mirror 330. In FIG. 1, a solid-line arrow (see reference numeral Y) extending from the dichroic mirror 330 denotes the yellow light component having transmitted the dichroic mirror 330.

The red light component having been reflected by the dichroic mirror 310 is reflected by the dichroic mirror 330 and input to the image forming region of the liquid crystal light modulation device 400R for a red light component.

The green light component from among the green light component and the blue light component having transmitted the dichroic mirror 310 is reflected by the dichroic mirror 320 and input to the image forming region of the liquid crystal light modulation device 400G for a green light component. Meanwhile, the blue light component transmits the dichroic mirror 320, then transmits the relay lens 360, the incidence-side reflecting mirror 340, the relay lens 370, and the emission-side reflecting mirror 350, and is subsequently input to the image forming region of the liquid crystal light modulation device 400B for a blue light component. The relay lenses 360 and 370 and the reflecting mirrors 340 and 350 have a function to guide the blue light component having transmitted the dichroic mirror 320 to the liquid crystal light modulation device 400B.

The reason why the relay lenses 360 and 370 and the reflecting mirrors 340 and 350 are provided in the optical path of the blue light component is to prevent degradation in light use efficiency due to light divergence or the like since the length of the optical path of the blue light component is longer than the length of the optical path of other color light components. Although in the projector 1000 of the first embodiment, since the length of the optical path of the blue light component is long, such configuration is made, the length of the optical path of the red light component may be extended, and the relay lenses 360 and 370 and the reflecting mirrors 340 and 350 may be used in the optical path of the red light component.

The liquid crystal light modulation devices 400R, 400G, and 400B modulate the input color light components in accordance with image information to form a color image, and are illuminated by the first illumination device 10 and the second illumination device 110. Though not shown, incidence-side polarizing plates are respectively disposed between the dichroic mirror 330 and the liquid crystal light modulation device 400R, between the dichroic mirror 320 and the liquid crystal light modulation device 400G, and between the reflecting mirror 350 and the liquid crystal light modulation device 400B. Emission-side polarizing plates are respectively disposed between the liquid crystal light modulation devices 400R, 400G, and 400B and the cross dichroic prism 500. Light modulation of the respective input color light components is carried out by the incidence-side polarizing plates, the liquid crystal light modulation devices 400R, 400G, and 400B, and the emission-side polarizing plates.

The liquid crystal light modulation devices 400R, 400G, and 400B are formed by sealing liquid crystal serving as an electro-optical material between a pair of transparent glass substrates. For example, each of the liquid crystal light modulation devices 400R, 400G, and 400B modulates the polarization direction of one linearly polarized light emitted from the corresponding incidence-side polarizing plate in accordance with a given image signal with a polysilicon TFT as a switching element.

The cross dichroic prism 500 is an optical element which combines modulated optical images for the respective color light components emitted from the emission-side polarizing plates to form a color image. The cross dichroic prism 500 is formed by bonding four rectangular prisms to each other and substantially has a square shape in plan view. A dielectric multilayer film is formed at an interface having a substantially X shape of the bonded rectangular prisms. A dielectric multilayer film formed at one interface having a substantially X shape reflects the red light component, and a dielectric multilayer film formed at another interface reflects the blue light component. These dielectric multilayer films cause the red light component and the blue light component to be bent and arranged in the traveling direction of the green light component, such that the three color light components are combined.

The color image emitted from the cross dichroic prism 500 is enlarged and projected by the projection optical system 600 to form an image on a screen SCR.

Next, the effects of the projector 1000 according to the first embodiment will be described.

According to the projector 1000 of the first embodiment, the two color light components (red light component and green light component) emitted from the first solid-state light source device 20 and one color light component (blue light component) emitted from the second solid-state light source device 120 are used as the three color light components (red light component, green light component, and blue light component) which are modulated by the liquid crystal light modulation devices 400R, 400G, and 400B. Therefore, the thermal load imposed on the respective solid-state light source devices can be reduced compared to a projector which includes a single solid-state light source device. As a result, the projection image can be brightened compared to a projector which includes a single solid-state light source device.

According to the projector 1000 of the first embodiment, the two color light components (red light component and green light component) from among the three color light components (red light component, green light component, and blue light component) which are modulated by the liquid crystal light modulation devices 400R, 400G, and 400B are generated by the common solid-state light source (first solid-state light source 24). Therefore, the color balance of the projection image can be stabilized compared to a projector which includes separate three solid-state light source devices for the respective color light components.

As a result, the projector 1000 of the first embodiment can brighten the projection image compared to a projector which includes a single solid-state light source device, and can stabilize the color balance of the projection image compared to a projector which includes separate three solid-state light source devices for respective color light components.

The projector 1000 of the first embodiment includes the dichroic mirror 40 which combines light emitted from the first solid-state light source device 20 and the blue light component emitted from the second solid-state light source device 120 with each other. Therefore, it is not necessary to provide exclusive-use optical systems for light emitted from the first solid-state light source device 20 and the blue light component emitted from the second solid-state light source device 120, such that the number of components can be reduced.

According to the projector 1000 of the first embodiment, a full color projector can be constituted by using the color separating and guiding optical system 300 which is widely used at present.

The projector 1000 of the first embodiment includes the first collimation optical system 30 and the second collimation optical system 130. The dichroic mirror 40 is disposed in the region including the intersection between the optical axis of the first collimation optical system 30 and the optical axis of the second collimation optical system 130. Therefore, light (including red light component and green light component) emitted from the first solid-state light source device 20 and the blue light component emitted from the second solid-state light source device 120 can be combined together as parallel light.

According to the projector 1000 of the first embodiment, main excitation light is a blue light component, the first color light component is a red light component, the second color light component is a green light component, and the third color light component is a blue light component. Therefore, light including a red light component, a green light component, and a blue light component can be emitted toward the liquid crystal light modulation devices 400R, 400G, and 400B by using the first solid-state light source 24 and the second solid-state light source 124 emitting blue light components together.

According to the projector 1000 of the first embodiment, the green light component is generated by using the first solid-state light source 24 (emitting the blue light component) which has high light-emission efficiency compared to the solid-state light source which is used in the solid-state light source device emitting the green light component. Therefore, light-emission efficiency can be increased compared to a case where the solid-state light source device emitting the green light component is used.

According to the projector 1000 of the first embodiment, the first solid-state light source 24 and the second solid-state light source 124 have the same temperature characteristic. Therefore, with regard to all of the color light components, changes in the light amount with change in temperature are made the same, such that the color balance of the projection image can be further stabilized.

According to the projector 1000 of the first embodiment, the fluorescent layer 26 is formed of a layer containing a YAG-based fluorescent material, $(Y,Gd)_3(Al,Ga)_5O_{12}:Ce$. Therefore, the projection image can be further brightened, and a high-reliable projector can be obtained.

According to the projector 1000 of the first embodiment, the dichroic mirror 330 has a function to remove the yellow light component from light from the first solid-state light source device 20. Therefore, the yellow light component can be removed from light from the first solid-state light source device 20. As a result, color reproducibility can be prevented from being deteriorated due to the yellow light component.

Second Embodiment

Figure 4:
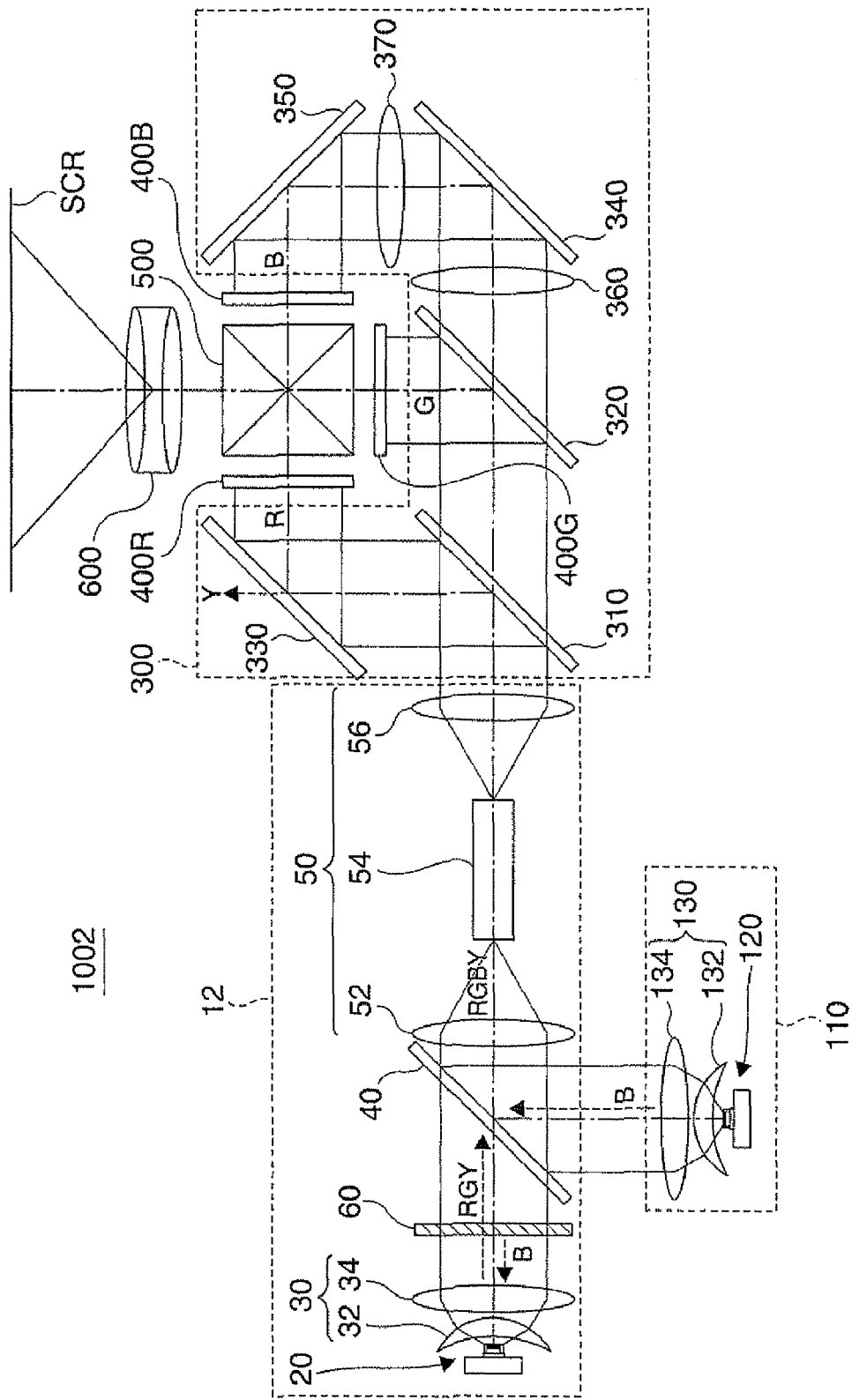
FIG. 4 is a plan view showing optical systems of a projector 1002 according to a second embodiment.

FIG. 4 is a plan view showing optical systems of a projector 1002 according to a second embodiment.

The projector 1002 of the second embodiment basically has the same configuration as the projector 1000 of the first embodiment, but a first illumination device has the configuration different from that in the projector 1000 of the first embodiment.

That is, in the projector 1002 of the second embodiment, as shown in FIG. 4, a first illumination device 12 further includes an excitation light reflecting mirror 60 which is located at the back of the collimation optical system 30 to directly transmit light (red light component, yellow light component, and green light component), which is converted by the fluorescent layer and emitted from the fluorescent layer 26, and to reflect excitation light (blue light component), which is emitted while being not converted by the fluorescent layer 26, toward the fluorescent layer 26.

As described above, in the projector 1002 of the second embodiment, the first illumination device has the configuration different from that in the projector 1000 of the first embodiment; however, the two color light components (red light component and green light component) emitted from the first solid-state light source device 20 and one color light component (blue light component) emitted from the second solid-state light source device 120 are used as the three color light components (red light component, green light component, and blue light component) which are modulated by the liquid crystal light modulation devices 400R, 400G, and 400B, and the two color light components (red light component and green light component) from among the three color light components (red light component, green light component, and blue light component) which are modulated by the liquid crystal light modulation devices 400R, 400G, and 400B are generated by using the common solid-state light source (first solid-state light source 24). Therefore, similarly to the projector 1000 of the first embodiment, the projection image can be brightened compared to a projector which includes a single solid-state light source device, and the color balance of the projection image can be stabilized compared to a projector which includes separate solid-state light source devices for respective color light components.

The projector 1002 of the second embodiment further includes the excitation light reflecting mirror 60. For this reason, main excitation light (blue light component) having directly transmitted the fluorescent layer 26 is input again to the fluorescent layer 26 and reused, such that light use efficiency can be improved, and consequently the projection image can be further brightened. Further, the main excitation light (blue light component) can be removed from light from the first solid-state light source device 20. As a result, color reproducibility or light modulation device can be prevented from being deteriorated due to main excitation light (blue light component).

In the projector 1002 of the second embodiment, main excitation light (blue light component) directly transmits the fluorescent layer 26 and is converted to parallel light by the first collimation optical system 30. Then, parallel light is reflected by the excitation light reflecting mirror 60, is focused by the first collimation optical system 30, and is efficiently input to the light-emission region of the fluorescent layer 26. Therefore, it is possible to suppress the spread of the light-emission region due to the excitation light reflecting mirror 60 being further provided.

The projector 1002 of the second embodiment has the same configuration as the projector 1000 of the first embodiment, excluding the configuration of the first illumination device. Therefore, the projector 1002 of the second embodiment also has the relevant effects from among the effects of the projector 1000 of the first embodiment.

Third Embodiment

Figure 5:
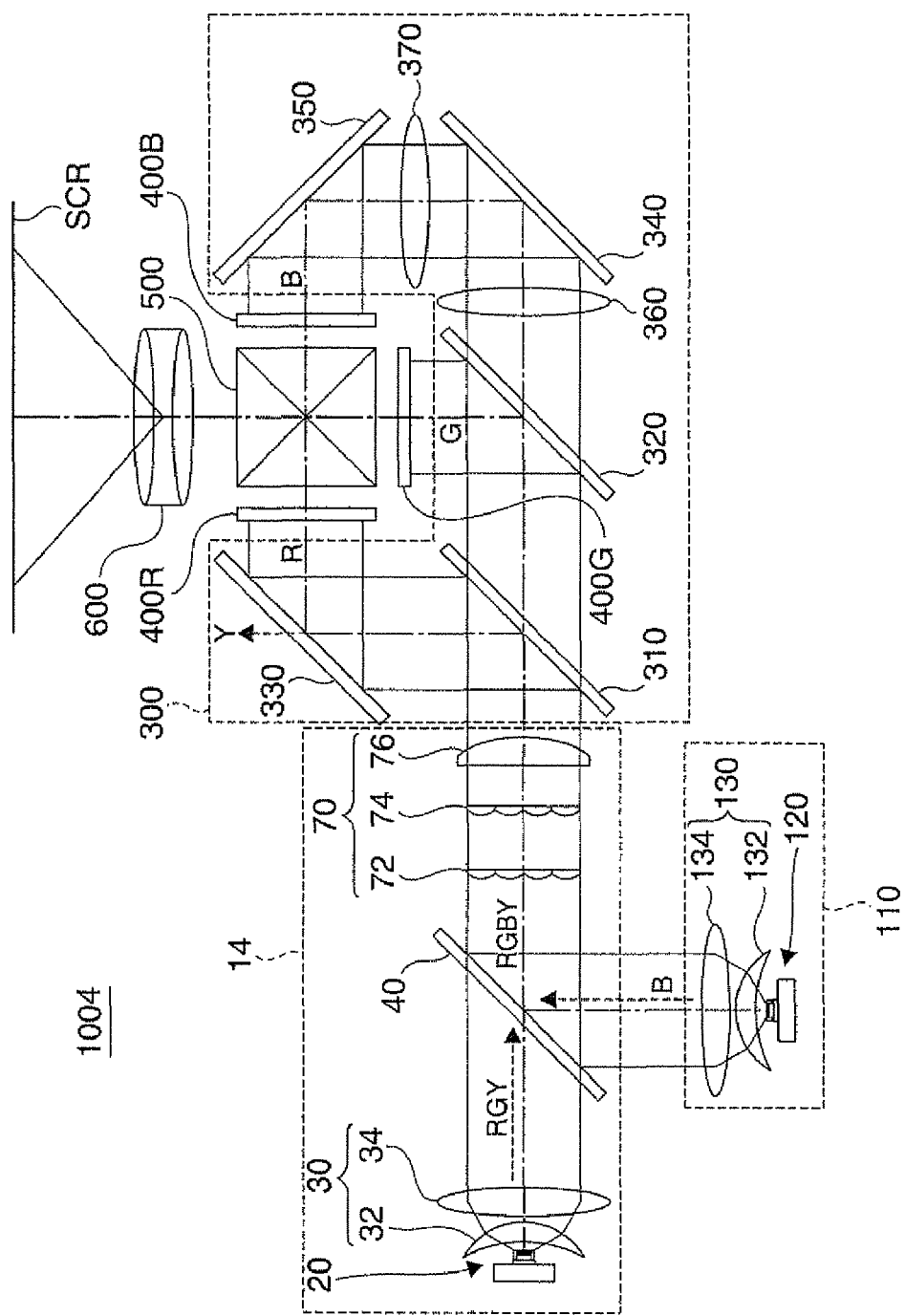
FIG. 5 is a plan view showing optical systems of a projector 1004 according to a third embodiment.

FIG. 5 is a plan view showing optical systems of a projector 1004 according to a third embodiment.

The projector 1004 of the third embodiment basically has the same configuration as the projector 1000 of the first embodiment, but a first illumination device has the configuration different from that in the projector 1000 of the first embodiment.

That is, in the projector 1004 of the third embodiment, as shown in FIG. 5, a first illumination device 14 includes a lens integrator optical system 70, instead of the rod integrator optical system 50. The lens integrator optical system 70 includes a first lens array 72, a second lens array 74, and a superimposing lens 76.

As described above, in the projector 1004 of the third embodiment, the first illumination device has the configuration different from that in the projector 1000 of the first embodiment; however, the two color light components (red light component and green light component) emitted from the first solid-state light source device 20 and one color light component (blue light component) emitted from the second solid-state light source device 120 are used as the three color light components (red light component, green light component, and blue light component) which are modulated by the liquid crystal light modulation devices 400R, 400G, and 400B, and the two color light components (red light component and green light component) from among the three color light components (red light component, green light component, and blue light component) which are modulated by the liquid crystal light modulation devices 400R, 400G, and 400B are generated by the common solid-state light source (first solid-state light source 24). Therefore, similarly to the projector 1000 of the first embodiment, the projection image can be brightened compared to a projector which includes a single solid-state light source device, and the color balance of the projection image can be stabilized compared to a projector which includes separate solid-state light source devices for respective color light components.

The projector 1004 of the third embodiment has the same configuration as the projector 1000 of the first embodiment, excluding the configuration of the first illumination device. Therefore, the projector 1004 of the third embodiment also has the relevant effects from among the effects of the projector 1000 of the first embodiment.

Fourth Embodiment

Figure 6:
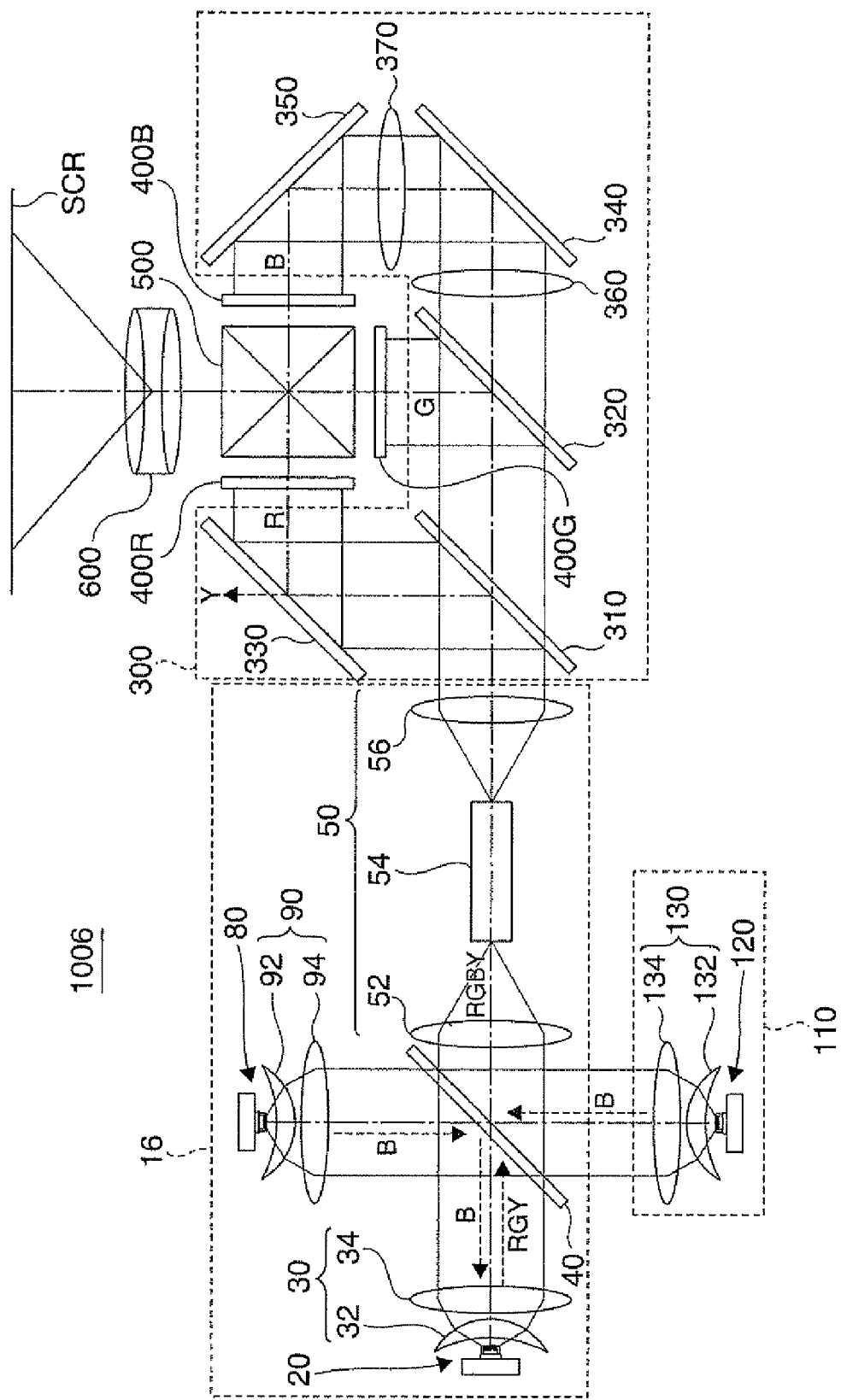
FIG. 6 is a plan view showing optical systems of a projector 1006 according to a fourth embodiment.

FIG. 6 is a plan view showing optical systems of a projector 1006 according to a fourth embodiment.

Figure 7:
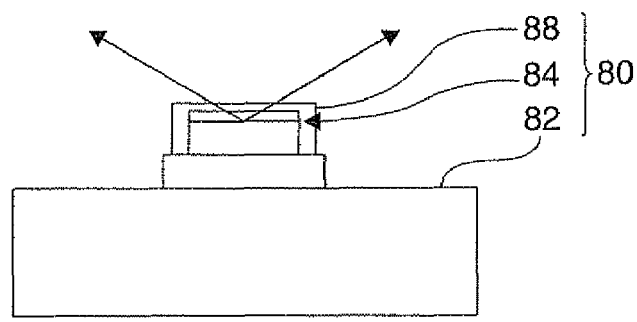
FIG. 7 is a sectional view of a third solid-state light source device 80 in the projector 1006 according to the fourth embodiment.

FIG. 7 is a sectional view of a third solid-state light source device 80 in the projector 1006 according to the fourth embodiment.

Figure 8:
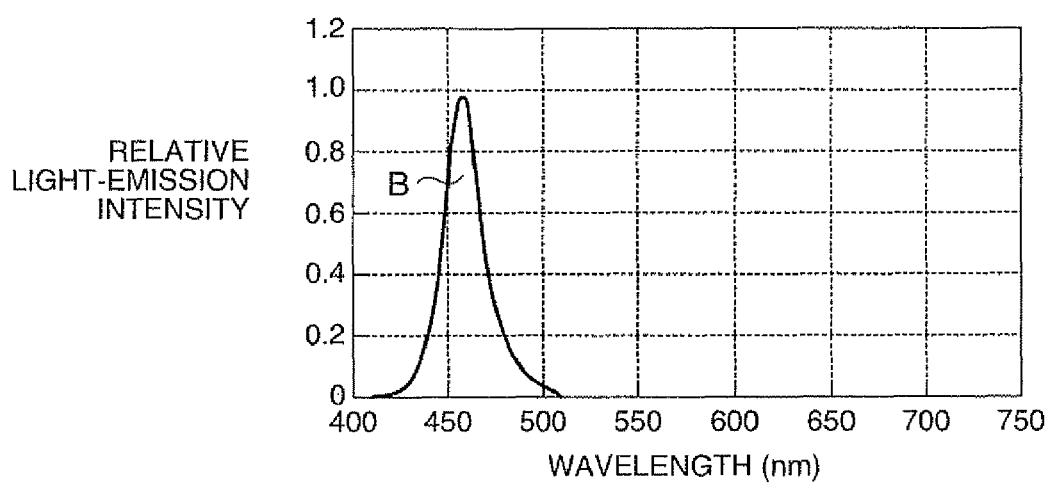
FIG. 8 is a graph showing relative light-emission intensity of a third solid-state light source 84 in the projector 1006 according to the fourth embodiment.

FIG. 8 is a graph showing relative light-emission intensity of a third solid-state light source 84 in the projector 1006 according to the fourth embodiment.

The projector 1006 of the fourth embodiment basically has the same configuration as the projector 1000 of the first embodiment, but a first illumination device has the configuration different from that in the projector 1000 of the first embodiment.

That is, in the projector 1006 of the fourth embodiment, as shown in FIGS. 6 and 7, a first illumination device 16 further includes a third solid-state light source device 80 which includes a third solid-state light source 84 emitting auxiliary excitation light (blue light component), and a third collimation optical system 90. Thus, the fluorescent layer 26 is configured to convert auxiliary excitation light (blue light component) to light including a red light component and a green light component, and to emit converted light. The dichroic mirror 40 which is a color light combining optical system is disposed in a region including an intersection between an optical axis of the first collimation optical system 30, an optical axis of the second collimation optical system 120, an optical axis of the third collimation optical system 90. The dichroic mirror 40 further has a function to reflect auxiliary excitation light (blue light component) from the third solid-state light source device 80, and to input auxiliary excitation light (blue light component) to the fluorescent layer 26 in an opposite direction to a direction in which main excitation light (blue light component) from the first solid-state light source 24 is input.

As shown in FIG. 7, the third solid-state light source device 80 is a light-emitting diode which has a base 82, a third solid-state light source 84, and a seal member 88, and emits a blue light component (see FIG. 8 which will be described below). The third solid-state light source device 80 has lead wires and the like in addition to the above-described constituent elements, but the lead wires and the like will not be shown or described.

As shown in FIG. 8, the third solid-state light source 84 emits a blue light component (the peak of light-emission intensity: about 460 nm) as auxiliary excitation light. In FIG. 8, reference numeral B denotes a color light component which is emitted as auxiliary excitation light (blue light component) from the third solid-state light source 84.

The base 82, the third solid-state light source 84, and the seal member 88 respectively have the same configuration as the base 22, the first solid-state light source 24, and the seal member 28, thus detailed description thereof will not be shown or described.

The first solid-state light source 24, the second solid-state light source 124, and the third solid-state light source 84 are formed of the same material by the same manufacturing method and have the same structure. For this reason, the first solid-state light source 24, the second solid-state light source 124, the third solid-state light source 84 have the same temperature characteristic, such that change in the light amount with change in temperature is identical.

As shown in FIG. 6, the third collimation optical system 90 includes a convex meniscus lens 92 suppressing the spread of the blue light component from the third solid-state light source device 80, and a convex lens 94 parallelizing the blue light component from the convex meniscus lens 92. As a whole, the third collimation optical system 90 has a function to parallelize the blue light component from the third solid-state light source device 80.

As described above, in the projector 1006 of the fourth embodiment, the first illumination device has the configuration different from that in the projector 1000 of the first embodiment; however, the two color light components (red light component and green light component) emitted from the first solid-state light source device 20 and one color light component (blue light component) emitted from the second solid-state light source device 120 are used as the three color light components (red light component, green light component, and blue light component) which are modulated by the liquid crystal light modulation devices 400R, 400G, and 400B, and the two color light components (red light component and green light component) from among the three color light components (red light component, green light component, and blue light component) which are modulated by the liquid crystal light modulation devices 400R, 400G, and 400B are generated by using the common solid-state light source (first solid-state light source 24 and third solid-state light source 84). Therefore, similarly to the projector 1000 of the first embodiment, the projection image can be brightened compared to a projector which includes a single solid-state light source device, and the color balance of the projection image can be stabilized compared to a projector which includes separate solid-state light source devices for respective color light components.

The projector 1006 of the fourth embodiment further includes the third solid-state light source device 80 which includes the third solid-state light source 84 emitting auxiliary excitation light (blue light component). Therefore, light including a red light component and a green light component can be emitted from the first solid-state light source device 20 by using two kinds of excitation light of main excitation light and auxiliary excitation light (which are both blue light components), and the projection image can be further brightened.

The projector 1006 of the fourth embodiment further includes the third collimation optical system 90. Thus, auxiliary excitation light (blue light component) which is converted to parallel light by the third collimation optical system 90 is reflected as parallel light by the dichroic mirror 40, is focused by the first collimation optical system 30, and is efficiently input to the light-emission region of the fluorescent layer 26. Therefore, it is possible to suppress the spread of the light-emission region due to the third solid-state light source device 80 being further provided.

According to the projector 1006 of the fourth embodiment, main excitation light is a blue light component, the first color light component is a red light component, the second color light component is a green light component, the third color light component is a blue light component, and auxiliary excitation light is a blue light component. Therefore, light including a red light component, a green light component, and a blue light component can be emitted toward the light modulation device by using the first solid-state light source 24, the second solid-state light source 124, and the third solid-state light source 84 emitting blue light components together.

According to the projector 1006 of the fourth embodiment, a green light component is generated by using the first solid-state light source 24 and the third solid-state light source 84 (emitting blue light components together) which have high light-emission efficiency compared to a solid-state light source which is used in a solid-state light source device emitting a green light component. Therefore, light-emission efficiency can be increased compared to a case where a solid-state light source device emitting a green light component is used.

According to the projector 1006 of the fourth embodiment, the first solid-state light source 24, the second solid-state light source 124, and the third solid-state light source device 84 have the same temperature characteristic. Therefore, with regard to all of the color light components, changes in the light amount with change in temperature are made the same, such that the color balance of the projection image can be further stabilized.

Although the invention has been described on the basis of the foregoing embodiments, the invention is not limited to the foregoing embodiments. The invention may be carried out in various forms without departing from the scope and spirit of the invention. For example, the following modifications may be made.

(1) Although in the foregoing embodiments, the fluorescent layer 26 is formed of a layer containing $(Y,Gd)_3(Al,Ga)_5O_{12}$:Ce, the invention is not limited thereto. For example, the fluorescent layer may be formed of a layer containing a YAG-based fluorescent material other than $(Y,Gd)_3(Al,Ga)_5O_{12}$:Ce, a layer containing a silicate-based fluorescent material, or a layer containing a TAG-based fluorescent material. Further, the fluorescent layer may be formed of a layer containing a mixture of a fluorescent material which converts excitation light to a red light component and a fluorescent material which converts excitation light to a green light component.

(2) Although in the foregoing embodiments, a transmission-type projector is used, the invention is not limited thereto. For example, a reflection-type projector may be used. The term "transmission-type" used herein means a type, such as a transmission-type liquid crystal display or the like, in which a light modulation device serving as a light modulation unit transmits light, and the term "reflection-type" means a type, such as a reflection-type liquid crystal display or the like, in which a light modulation device serving as a light modulation unit reflects light. Even when the invention is applied to a reflection-type projector, the same effects as in a transmission-type projector can be obtained.

(3) Although in the foregoing embodiments, a liquid crystal light modulation device is used as a light modulation device for a projector, the invention is not limited thereto. As a light modulation device, in general, any device may be used insofar as the device modulates incident light in accordance with image information. For example, a micromirror-type light modulation device or the like may be used. As a micromirror-type light modulation device, for example, DMD (Digital Micromirror Device) (Trademark of TI Inc.) may be used.

(4) Although in the foregoing embodiments, the respective solid-state light source devices are light-emitting diodes, the invention is not limited thereto.

The respective solid-state light source devices may be, for example, semiconductor laser or organic light-emitting diodes.

(5) Although in the first to third embodiments, main excitation light is a blue light component, the invention is not limited thereto. Main excitation light may be ultraviolet light. With this configuration, light including a red light component, a green light component, and a blue light component can be emitted from the first illumination device toward the light modulation device, and light-emission efficiency can be increased compared to a case where a solid-state light source device emitting a green light component is used.

(6) In the first to third embodiments, when main excitation light is ultraviolet light, the first color light component may be a green light component, the second color light component may be a blue light component, and the third color light component may be a red light component. Further, the first color light component may be a red light component, the second color light component may be a blue light component, and the third color light component may be a green light component.

(7) Although in the fourth embodiment, main excitation light and auxiliary excitation light are both blue light components, the invention is not limited thereto. Main excitation light may be a blue light component, and auxiliary excitation light may be ultraviolet light. Further, main excitation light may be ultraviolet light, and auxiliary excitation light may be a blue light component. In addition, main excitation light and auxiliary excitation light may be both ultraviolet light. With this configuration, light including a red light component, a green light component, and a blue light component can be emitted from the first illumination device toward the light modulation device, and light-emission efficiency can be increased compared to a case where a solid-state light source device emitting a green light component is used.

(8) In the fourth embodiment, when main excitation light is a blue light component, and auxiliary excitation light is ultraviolet light, or when main excitation light is ultraviolet light, and auxiliary excitation light is a blue light component, an excitation light reflecting mirror may be further provided which is disposed in front of the color light combining optical system (dichroic mirror) to directly transmit light emitted from the fluorescent layer and to reflect main excitation light, which is emitted while being not converted by the fluorescent layer, toward the fluorescent layer. With this configuration, main excitation light which directly transmits the fluorescent layer while being not converted is input again to the fluorescent layer and reused, such that light use efficiency can be improved, and consequently the projection image can be further brightened.

(9) Although in the foregoing embodiments, the projector has a function to remove a yellow light component from the first solid-state light source device 20, the invention is not limited thereto. For example, the projector may not have a function to remove a yellow light component. In this case, the yellow light component included in light emitted from the first illumination device can be positively used, such that a brighter projection image can be projected. Further, when the yellow light component is not removed, the yellow light component is modulated by using a light modulation device different from that for a red light component or a green light component, such that a projection image having more excellent color reproducibility can be projected, in addition to the above-described effects.

Figure 9:
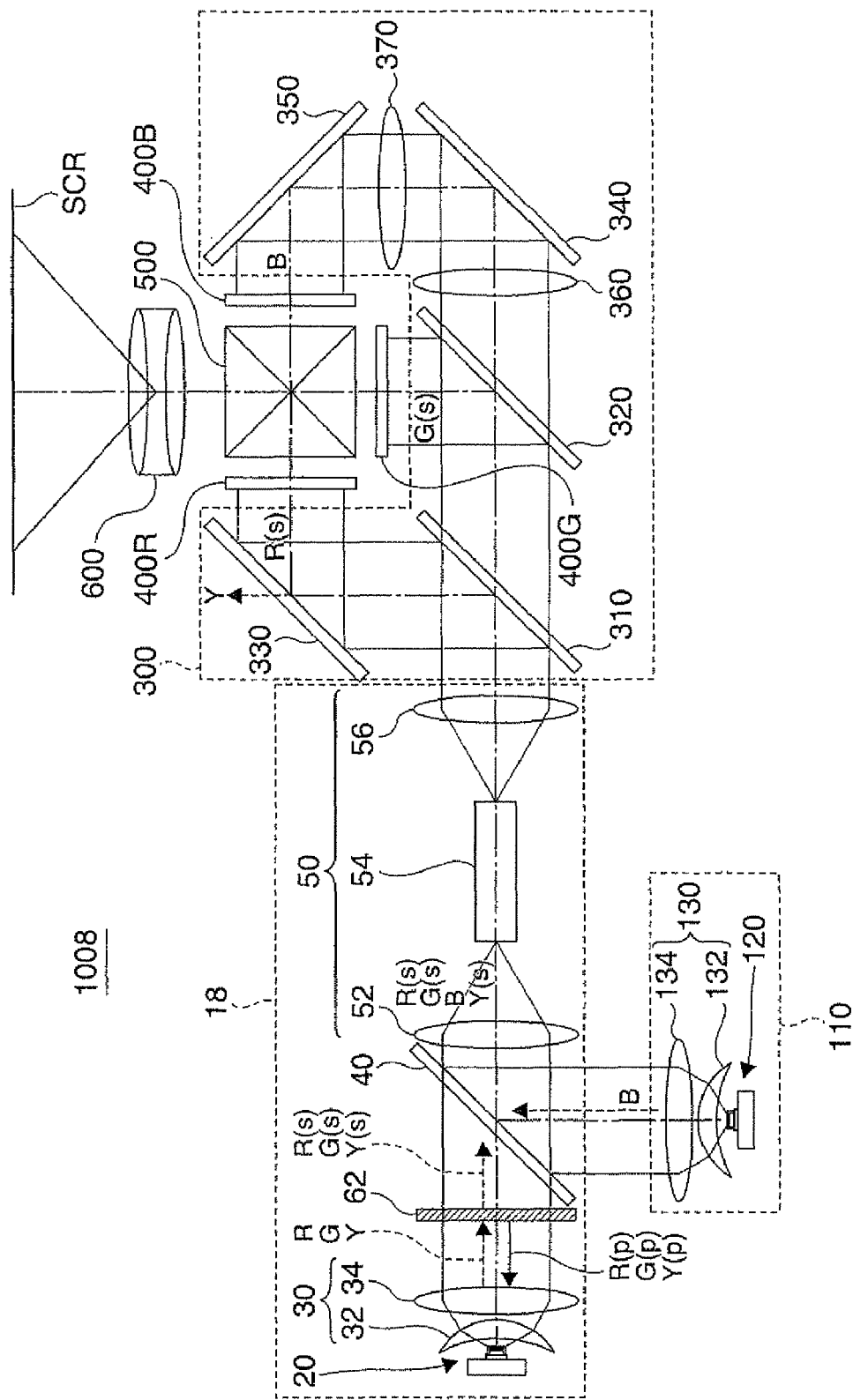
FIG. 9 is a plan view showing optical systems of a projector 1008 according to a modification.

(10) In the foregoing embodiments, as shown in FIG. 9, a reflection-type polarizing plate 62 may be further provided which is located at the back of the first collimation optical system 30 to directly transmit one polarized component (for example, s polarized component) from among polarized components included in light emitted from the first solid-state light source device 20 and to reflect another polarized component (for example, p polarized component) toward the fluorescent layer 26. FIG. 9 is a plan view showing optical systems of a projector 1008 according to a modification. The reflection-type polarizing plate 62 is, for example, a wire grid polarizing plate which has fine metal wires disposed in a lattice shape at specific pitches. In FIG. 9, a solid-line arrow (see reference numeral R(p),G(p),Y(p)) extending from the reflection-type polarizing plate 62 denotes another polarized component (p polarized component) reflected by the reflection-type polarizing plate 62. With this configuration, another polarized component (p polarized component) is returned again to the fluorescent layer 26 and reflected by the surface of the fluorescent layer 26, such that part of another polarized component (p polarized component) is converted to one polarized component (s polarized component) and reused. Therefore, light use efficiency can be improved, and consequently the projection image can be further brightened.

(11) In the foregoing embodiments, the projector may further include a polarization conversion device. The polarization conversion device is a polarization conversion element which converts light including one polarized component and another polarized component to substantially one linearly polarized light with a polarization direction arranged.

(12) Although in the foregoing embodiments, each collimation optical system includes two lenses of the convex meniscus lens and the convex lens, the invention is not limited thereto. For example, the collimation optical system may include only one lens or may include three or more lenses.

(13) The shape of each of the lenses which are used in the optical path of the projector in each of the foregoing embodiments is not limited to those described in the foregoing embodiments. If necessary, lenses having various shapes may be used.

(14) Although in the foregoing embodiments, an example where a projector uses three liquid crystal light modulation devices has been described, the invention is not limited to this example. The invention may be applied to a projector which uses one, two, or four or more liquid crystal light modulation devices.

(15) The invention may be applied to a front projection-type projector which projects a projection image from an observation side, or a rear projection-type projector which projects a projection image from an opposite side to the observation side.

The entire disclosure of Japanese Patent Application No: 2009-196442, filed Aug. 27, 2009 is expressly incorporated by reference herein.

What is claimed is:
1. A projector comprising:
a first solid-state light source device which includes a first solid-state light source emitting main excitation light, and a fluorescent layer converting main excitation light emitted from the first solid-state light source to light including a first color light component and a second color light component different from the first color light component, and emitting converted light;
a second solid-state light source device which includes a second solid-state light source emitting a third color light component different from the first color light component and the second color light component;
a light modulation device modulating the first color light component, the second color light component, and the third color light component in accordance with image information;
a projection optical system projecting the modulated light components from the light modulation device as a projection image; and
a color light combining optical system combining light emitted from the first solid-state light source device and the third color light component emitted from the second solid-state light source device, the color light combining optical system is disposed between the first solid-state light source device and the light modulation device.
2. The projector according to claim 1, further comprising:
a first collimation optical system parallelizing light emitted from the first solid-state light source device; and
a second collimation optical system parallelizing the third color light component emitted from the second solid-state light source device, wherein the color light combining optical system is disposed in a region including an intersection between an optical axis of the first collimation optical system and an optical axis of the second collimation optical system to directly transmit light which is converted by the fluorescent layer and emitted from the fluorescent layer, to reflect the third color light component from the second solid-state light source device, and to combine light emitted from the first solid-state light source device and the third color light component with each other.

3. The projector according to claim 2, further comprising:
an excitation light reflecting mirror located at the back of the first collimation optical system to directly transmit light, which is converted by the fluorescent layer and emitted from the fluorescent layer, and to reflect main excitation light, which is emitted while not being converted by the fluorescent layer, toward the fluorescent layer.

4. The projector according to claim 1,
wherein main excitation light is a blue light component,
the first color light component is a red light component,
the second color light component is a green light component, and
the third color light component is a blue light component.

5. The projector according to claim 4,
wherein the first solid-state light source and the second solid-state light source have the same temperature characteristic.

6. The projector according to claim 1,
wherein main excitation light is ultraviolet light,
the first color light component is a red light component,
the second color light component is a green light component, and
the third color light component is a blue light component.

7. The projector according to claim 1, further comprising:
a third solid-state light source device which includes a third solid-state light source emitting auxiliary excitation light,
wherein the fluorescent layer is configured such that auxiliary excitation light is input thereto in a direction different from a direction in which main excitation light is input, and
the fluorescent layer is configured to convert auxiliary excitation light with main excitation light to light including the first color light component and the second color light component and to emit converted light.

8. The projector according to claim 7, further comprising:
a first collimation optical system parallelizing light emitted from the first solid-state light source device;
a second collimation optical system parallelizing the third color light component emitted from the second solid-state light source device; and
a third collimation optical system parallelizing auxiliary excitation light emitted from the third solid-state light source device,
wherein the color light combining optical system is disposed in a region including an intersection between an optical axis of the first collimation optical system, an optical axis of the second collimation optical system, and an optical axis of the third collimation optical system to directly transmit light, which is converted by the fluorescent layer and emitted from the fluorescent layer, to reflect the third color light component from the second solid-state light source device, thereby combining light emitted from the first solid-state light source and the third color light component with each other, and to reflect auxiliary excitation light from the third solid-state light source device such that auxiliary excitation light is input to the fluorescent layer in an opposite direction to a direction in which main excitation light is input from the first solid-state light source.

9. The projector according to claim 7,
wherein main excitation light is a blue light component,
the first color light component is a red light component,
the second color light component is a green light component,
the third color light component is a blue light component, and
auxiliary excitation light is a blue light component.

10. The projector according to claim 9,
wherein the first solid-state light source, the second solid-state light source, and the third solid-state light source have the same temperature characteristic.

11. The projector according to claim 7,
wherein main excitation light is a blue light component,
the first color light component is a red light component,
the second color light component is a green light component,
the third color light component is a blue light component, and
auxiliary excitation light is ultraviolet light.

12. The projector according to claim 11, further comprising:
an excitation light reflecting mirror disposed in front of the color light combining optical system to directly transmit light, which is converted by the fluorescent layer and emitted from the fluorescent layer, and to reflect main excitation light, which is emitted while being not converted by the fluorescent layer, toward the fluorescent layer.

13. The projector according to claim 7,
wherein main excitation light is ultraviolet light,
the first color light component is a red light component,
the second color light component is a green light component,
the third color light component is a blue light component, and
auxiliary excitation light is a blue light component.

14. The projector according to claim 13, further comprising:
an excitation light reflecting mirror disposed in front of the color light combining optical system to directly transmit light, which is converted by the fluorescent layer and emitted from the fluorescent layer, and to reflect main excitation light, which is emitted while being not converted by the fluorescent layer, toward the fluorescent layer.

15. The projector according to claim 7,
wherein main excitation light is ultraviolet light,
the first color light component is a red light component,
the second color light component is a green light component,
the third color light component is a blue light component, and
auxiliary excitation light is ultraviolet light.

16. The projector according to claim 1,
wherein the fluorescent layer is formed of a layer containing a YAG-based fluorescent material, a silicate-based fluorescent material, or a TAG-based fluorescent material.

17. The projector according to claim 1,
wherein a function is provided to remove a yellow light component from light from the first solid-state light source device.

18. The projector according to claim 17, further comprising:
a color separating and guiding optical system separating the first color light component, the second color light component and the third color light component from light from the first solid-state light source device and the second solid-state light source device, guiding the separated first, second and third color light components to the light modulation device respectively, and removing a yellow color light component from light from the first solid-state light source device.

* * * * *